United States Patent Office 3,389,073
Patented June 18, 1968

3,389,073
VERMICULAR GRAPHITE STRUCTURES AND PROCESS OF MAKING
Leonard M. Vaught, John J. Newport III, and Oliver Osborn, Lake Jackson, Tex., assignors to The Dow Chemical Company, Midland, Mich., a corporation of Delaware
No Drawing. Filed Mar. 30, 1966, Ser. No. 538,585
13 Claims. (Cl. 204—294)

This invention relates to improved graphite structures and the method of their preparation. It more particularly relates to improved graphite structures having electrical and thermal characteristics oriented in a predetermined direction. Such graphite structures find particular application as anodes for the electrolytic production of magnesium, sodium, iron, steel and the like.

In the manufacture of magnesium by the electrolysis of $MgCl_2$-containing molten salt bath using graphite electrodes, which accounts for most of the world production of magnesium, an operating temperature of about 700 to 750° C. is usually employed. At these temperatures, the graphite electrodes are subject to oxidation, particularly in the area immediately above the molten salt bath. This has presented a serious problem and many solutions have been proposed but no practical solution has heretofore been available. In the electric furnace method for making steel, the problem has been even more severe due to the use of operating temperatures near 1500° C.

Further, for use as an anode in an electrolytic process, it is desirable that the resistivity of the graphite structure be as low as possible in the axis between the electrical contact and the electrolytic bath or furnace. In the case of the typical cylindrical anode, therefore, it is highly desirable to have as little resistance as possible along the long or longitudinal axis of the anode.

It is therefore an object of this invention to prepare a graphite structure suitable for use as an electrode in the electrolytic production of metals such as magnesium or steel, which possesses improved properties, particularly oxidation resistance. Another object is to provide a method whereby such improved graphite structures may be prepared. Another object is to provide an improved and less costly electrolytic process for producing metals such as steel and magnesium by employing such improved graphite structures. These and other objects and advantages of the present invention will become obvious from the following detailed description of the invention.

It has now been discovered that a new and improved graphite structure may be prepared from a low density, expanded vermicular graphite, i.e. having a maximum bulk density of about 0.01 gm./cc., by first compressing such particulate vermicular graphite in one or more axes to an increased, but still comparatively low bulk density (relating to the absolute density of the graphite), i.e. a bulk density of greater than about 0.25 gm./cc. and subsequently isostatically further compressing the relatively lowly compacted material to a relatively high apparent density, i.e. a minimum of about 1.5 gm./cc. A graphite structure is thereby produced which is highly anisotropic both thermally and electrically and has improved conductivity and electrical efficiency, has low permeability to gases and high oxidation resistance. Graphite structures produced in this manner may be made entirely of compressed vermicular graphite or may be made of a conventional electrographite core clad with an outer shell of compressed vermicular graphite.

The vermicular graphite employed herein is a compressible form of graphite prepared by introducing an intercalating agent between the laminae of natural or synthetic graphite and expanding such treated graphite by heating. For example, a heat-expandable graphite may be prepared by contacting graphite particles of about 10 to 325 mesh with an intercalating agent such as fuming nitric acid, fuming sulfuric acid, mixtures of concentrated nitric and sulfuric acids, perhaloacids or the like for a period of at least one minute. The treated graphite particles may then be washed free of excess intercalating agent and dried if desired. The resulting treated graphite is expandable by heat and, if unconfined, will increase in volume from about 20 to about 600 times upon heating. Such expanded graphite is usually in light weight particulate, vermicular, worm-like form and is easily maleable and compressible into shaped monolithic structures. Such expanded material is sufficiently light and fluffy that it may have a bulk density of 0.005 gm./cc. or even less but upon sufficient compression may approach its theoretical density of 2.26 gm./cc.

While radial compression of such vermicular graphite to a high density will produce a dense cylindrical anode having exceptionally low resistivity along the longitudinal axis, the formation of relatively large cylindrical anodes by radial compression of vermicular graphite presents serious mechanical problems due to the extremely large volume changes and high pressures required to increase the bulk density to about 1.9 gm./cc. or higher. It has unexpectedly been discovered, however, that cylindrical anodes may be prepared which have low resistivity in the longitudinal axis by first radially compressing the vermicular graphite to a relatively light weight integral compact having a density of at least about 0.25, preferably about 0.5 to 0.7 gm./cc., and subsequently compressing such compact under isostatic compression to the desired higher density, e.g. to about 1.5 gm./cc. or above. The original radial compression effectively orients the compact in a manner such that when equal pressure is applied at all surfaces (i.e. isostatically), the compact will continue to compress and decrease in volume primarily along the axis of the vector of the original radial compression and produces a dense structure having substantially the same electrical conductivity characteristics as one which was radially compressed to the higher density.

In the first step of this process wherein the vermicular graphite is compressed into a relatively low density integral structure, any suitable means of radial, uniaxial or biaxial compression may be employed. For example, vermicular graphite may be placed in a flexible bag or sleeve which is then subjected to radial fluid pressure sufficient to produce radial compression of the compact. A pressure of from about 200 to about 300 p.s.i. is usually required to produce a compact having a density in the range of about 0.5 to 0.7 gm./cc. Usually no advantage is gained by compression at pressures above 300 p.s.i.

The radially compressed compact is then isostatically compressed by suitable means. A convenient procedure for isostatic compression is that commonly employed to compress ceramics and metal powders. In this method, the radially compressed compact is placed in a flexible bag or sleeve, usually made of rubber or plastic. The filled bag or sleeve is then placed in a fluid-filled autoclave and sufficient pressure is applied to produce a compact of the desired density. For use as an anode, a density of from about 1.5 to 2.0 gm./cc. is generally desirable. Such densities are produced by exerting isostatic pressures on the compact of from about 3500 to 50,000 p.s.i. with a pressure of about 20,000 p.s.i. being usually most practical.

After the desired density is achieved, the graphite structure may be machined to a desired tolerance or to achieve improved surface smoothness and uniformity. Even the high density compacts have a relatively low surface hardness and are easy to form or thread by machining.

Graphite structures prepared in this manner for use as anodes have a resistivity in the longitudinal direction in the order of 140–170 microhm-inches compared to a resistivity in the order of 250–340 microhm-inches for typical anodes made from the Acheson process graphite. Likewise, the anodes prepared in accordance with this process have an oxidation rate at 700° C. of only about ⅓ to about ½ of that found for conventional electrographite. Another striking improvement of anodes prepared in accordance with the present invention is that the gas permeability to helium is only about one millionth that of conventional graphite.

In an alternate embodiment the vermicular graphite may be first fitted or lightly compressed uniaxially to a density of from about 0.015 to about 0.10 gm./cc. prior to radial compression. Such uniaxial compression increases the resistivity of the final compact somewhat but this effect may be substantially overcome by applying higher pressure, e.g. 2,000 to 20,000 p.s.i., in the radial compression step.

Substantially the same advantages are achieved by cladding standard electrographite with compressed vermicular graphite in the same general manner as set forth hereinbefore. In one embodiment, e.g. a rod or cylinder of standard electrographite, such as Acheson graphite or pyrolytic graphite, is employed which is smaller in diameter than that desired for the finished anode. Such rod or cylinder is centrally placed in a bag or sleeve, surrounded by vermicular graphite and radially compressed as previously described. The electrographite rod clad with the relatively low density compressed vermicular graphite is then isostatically compressed to produce a relatively high density coating of compressed vermicular graphite directly affixed, i.e. bonded to the electrographite core. Surprisingly, in addition to the enhanced conductivity, oxidation resistances and lack of permeability, such cladding has been found to expand and contract with the core upon heating and cooling so that no rupturing occurs between the coating and the core such as is common where carbon or graphite is clad with other materials. Alternately, such cladding may be achieved by surrounding the central rod or cylinder with rings or washers of intermediate density prepared by radial compression. Isostatic compression of the structure to a relatively high density produces a clad anode having improved characteristics. Likewise the central rod or cylinder may be wrapped with one or more layers of an intermediate density compressed vermicular graphite foil. Isostatic compression of such structure produces a clad electrode having improved conductivity and oxidation characteristics.

The most desirable proportion of cladding to electrographite core will depend on the characteristics needed and the conditions under which such anode is to be employed. At relatively low temperatures, e.g. around 700° C,. a compressed vermicular graphite shell or cladding of about ¼ inch in thickness on a core of electrographite of 9 inches in diameter is usually sufficient to produce an anode having significantly improved gas impermeability and oxidation resistance for extended periods of time. For longer periods of use and more severe conditions of temperature, thicker cladding or solid anodes of compressed vermicular graphite are advantageous. An increased proportion of cladding gives improved electrical and thermal conductivity and permits the anode to maintain oxidation resistance and impermeability to gases for longer periods under more severe conditions.

An additional advantage of the anodes composed of compressed vermicular graphite or clad therewith is the lack of brittleness and the increased ability to withstand shock impact. Electrographite is brittle and prone to chip and break during handling. Compressed expanded graphite, however, is somewhat maleable even when highly compressed and will act as a shock absorber for encapsulated electrographite.

Once prepared as above described to the desired size and shape, an electrode containing at least a surface of compressed expanded graphite may be used in standard electrolytic methods for the production of metals such as magnesium, sodium, steel, and the like, without further modification of the equipment or the procedure. Such electrodes provide significant improvements in electrical and thermal conductivity, thermal and mechanical shock resistance, gas impermeability and resistance to oxidation.

The following examples will more fully illustrate the invention but are not to be construed as limiting its scope thereto.

Example 1

A quantity of vermicular graphite was prepared by treating natural flake graphite with red fuming nitric acid and heating such treated flake to a temperature of around 1000° C. The vermicular graphite thus produced was a mass of worm-like particles having a bulk density of 0.005 gm./cc.

A portion of the vermicular graphite thus prepared was placed in a rubber sleeve within a pressurizable vessel and the ends of the rubber sleeve were affixed in such a manner that pressure within the vessel would be exerted radially on the rubber sleeve. Water pressure of 300 p.s.i. was then applied within the vessel to thereby radially compress the graphite. The radially compressed cylinder of graphite was removed from the rubber sleeve and found to have a density of about 0.65 gm./cc. Such graphite cylinder was then transferred to a sealed rubber bag, evacuated to remove the air, and placed in a pressure vessel wherein it was completely surrounded with water. Pressure within the vessel was then raised to 50,000 p.s.i., released and the sealed rubber bag containing the compressed graphite was removed therefrom. Upon removal from the bag, the graphite cylinder was found to have a density of 1.95 gm./cc., an electrical conductivity in the longitudinal axis of 151 microhm-inches and an electrical conductivity of about 1900 microhm-inches in the radial axis.

Such anode was heated to a temperature of 600° C. in a resistance heated tube furnace. A stream of air was continuously passed over the heated graphite and its weight was continuously monitored. Results obtained from such controlled oxidation were as follows:

| Time, Min. | Sample Weight, gms. | Weight Loss, Percent | Weight Loss, gm./minute |
|---|---|---|---|
| 0 | 12.420 | | |
| 599 | 12.180 | 1.9 | 0.00040 |
| 1,117 | 11.942 | 3.9 | 0.00047 |
| 1,369 | 11.810 | 4.9 | 0.00053 |
| 2,262 | 11.253 | 9.4 | 0.00062 |
| 2,337 | 11.203 | 9.8 | 0.00067 |
| 2,667 | 10.983 | 11.6 | 0.00067 |
| 3,722 | 10.277 | 17.3 | 0.00067 |
| 3,847 | 10.190 | 18.0 | 0.00069 |
| 4,919 | 9.364 | 24.6 | 0.00068 |
| 5,424 | 9.016 | 27.4 | 0.00069 |
| 6,365 | 8.294 | 33.4 | 0.00077 |

As a comparison, a cylinder of commercially available electrographite ½ inch in diameter and 2 inches in length was likewise oxidized in the same furnace and under the same conditions. This electrographite cylinder had a specific resistivity of about 280 microhm-inches and a density of 1.67 gm./cc. The results obtained were as follows:

| Time, Min. | Sample Weight, gms. | Weight Loss, Percent | Weight Loss, gm./minute |
|---|---|---|---|
| 0 | 10.126 | | |
| 900 | 8.648 | 14.6 | 0.00164 |
| 1,140 | 8.054 | 20.4 | 0.00247 |
| 1,200 | 7.904 | 22.0 | 0.00249 |
| 1,345 | 7.541 | 25.6 | 0.00252 |
| 1,675 | 6.744 | 33.4 | 0.00242 |

These results show that the weight loss due to oxidation of the anode of this invention is only about ⅙ of that of conventional electrographite.

In the same manner, a portion of the vermicular graphite was radially compressed into cylindrical shape under a force of 250 p.s.i. and then isostatically compressed under a pressure of 30,000 p.s.i. The compressed graphite cylinder produced thereby had a density of 1.86 mg./cc. and an electrical resistivity of 169 microhm-inches. When tested for oxidation rate by the above method, substantially the same results were obtained as with the compressed vermicular graphite anode above.

Example 2

An additional portion of the expanded low density vermicular graphite prepared in Example 1 was placed in a wooden mold having a cross-section of 1¼ inches x 4⅝ inches and compressed uniaxially to a density of 0.60 gm./cc. The compact thus produced was placed in a sealed rubber bag and evacuated to remove the air therefrom. The rubber bag was then subjected to an isostatic hydrostatic pressure of 50,000 p.s.i. and the compacted graphite was found to have a density of 1.93 gm./cc., an electrical resistivity along the axis of original compression of about 24,800 microhm-inches and an electrical resistivity along the axis at right angles to the axis of original compression of 161 microhm-inches.

Example 3

In a manner similar to Example 1, natural flake graphite was treated with an acid mixture containing 85% by weight concentrated sulfuric acid and 15% by weight concentrated nitric acid. The acid-treated flakes were then heat expanded in a methane flame at a temperature of about 1000° C. to produce vermicular graphite having a bulk density of about 0.005 gm./cc.

A portion of the vermicular graphite thus produced was radially compressed, in the same manner as Example 1, to a density of 0.26 gm./cc. The compact thus produced was then heated to 1450° C. under vacuum for 45 minutes to remove any residual acid contained therein, and then isostatically compressed in the manner of Example 1 to a pressure of 50,000 p.s.i. to form a cylindrical graphite rod.

The compressed vermicular graphite rod thus produced was then employed as the anode in an electric furnace. A standard graphite crucible acted as the furnace shell and as the cathode. To such crucible was added 100 gm. of steel scrap and current was passed between the anode and cathode until a pool of molten steel was obtained. Weighing of the compressed vermicular graphite anode before and after use showed a weight loss due to arc erosion and oxidation equivalent of 0.15 gm. of graphite/100 gm. of steel or 3 pounds of graphite per ton of steel. This compares to accepted commercial losses of 9 to 13 pounds of electrographite per ton of steel.

Example 4

Another portion of the vermicular graphite prepared in Example 3 was applied as cladding to a 9 inch diameter cylinder of electrographite. Rings of compressed vermicular graphite were prepared in a circular mold having a centrally located circular pin to provide an annular space with an inside diameter of 9 inches and an outside diameter of 18 inches. Such mold was filled with vermicular graphite and compression applied with a metal ring piston having the same inside and outside dimensions as the annular space. Sufficient pressure was applied to the vermicular graphite to produce rings having a thickness of 6 inches and a density of 0.05 gm./cc. The rings were removed from the pin and an electrographite cylinder having a 9 inch diameter was inserted into a stack of 10 of such low density rings. The composite graphite cylinder thus prepared was then radially compressed under a pressure of 300 p.s.i. to compress the cladding to a density of 0.6 gm./cc. Such clad cylinder was then isostatically compressed at a pressure of 20,000 p.s.i. to produce a cladding having a density of 1.85 gm./cc. High pressure isostatic compression joined the ring segments into a continuous coating about ¼ inch in thickness.

Example 5

Another portion of the vermicular graphite prepared in accordance with Example 3 was used to clad a cylindrical electrographite anode having a 9 inch diameter. An 18 inch diameter pipe closed at one end was placed around the 9 inch diameter anode and vermicular graphite was placed in the annular space thus formed. A piston was employed to compress the graphite in the annular space to a density of about 0.05 gm./cc. More vermicular graphite was added above the slightly compacted graphite and this material was compressed to a density of about 0.05 gm./cc. This procedure was repeated until the electrographite rod was covered with slightly compacted graphite. The purpose of such compression was not to orient the electrical characteristics of the graphite but rather to form a monolithic structure which was not electrically oriented but which could be mechanically handled. It is therefore desirable to compress the graphite in this step as little as possible to obtain a monolithic structure and not to exceed a bulk density of 0.10 gm./cc.

The 18 inch diameter cylinder 60 inches long and containing a core of electrographite 9 inches in diameter was then radially compressed until the cladding had a density of 0.55 gm./cc. and finally compressed isostatically to cladding density of 1.95 gm./cc. The resulting anode had a ¼ inch continuous layer of compressed vermicular graphite surrounding the electrographite core.

Example 6

Another portion of vermicular graphite prepared in accordance with Example 3 was compressed between rollers to a felt or foil having a density of 0.18 gm./cc. or less. Such foil was wrapped around a 2 inch cylinder of electrographite until a 6 inch layer was produced and the composite was radially compressed to about 300 p.s.i. then isostatically compressed to 12,000 p.s.i. to produce a clad electrode having an oxidation rate measured at 600° C. of about ⅓ of that of a good anode of commercial electrographite having a density of about 1.67 gm./cc. The resistivity along the longitudinal axis of the compressed graphite was 170 microhm-inches.

Example 7

Another portion of the vermicular graphite prepared in accordance with Example 3 was radially compressed under a force of 300 p.s.i. into a cylindrical form having a density of 0.65 gm./cc. The cylinder thus produced was then isostatically compressed under a force of 35,000 p.s.i. to form a cylindrical compact having a density of 1.87 gm./cc. and a resistivity of 145 microhm-inches in the longitudinal axis.

Two electrolytic cells were prepared to produce magnesium from a standard molten $MgCl_2$ bath at 750° C. The cells were operated under identical conditions except that the anode prepared in this example was employed as the anode in one such cell and a standard electrographite anode was employed in the other cell. After 159 ampere-hours had passed through each of the cells, the anodes were removed and weighed. The compressed vermicular graphite anode was found to have lost only 0.059 gm. of weight per gm. of magnesium produced whereas the electrographite had lost 0.096 gm. per gm. of magnesium produced.

Various modifications can be made in the present invention without departing from the spirit or scope thereof for it is understood that we limit ourselves only as defined in the appended claims.

We claim:

1. A process for preparing an electrically oriented graphite structure which comprises initially compressing vermicular graphite in one axis under sufficient pressure to form an integral structure having a density of at least about 0.25% gm./cc. and subsequentially isostatically compressing such integral structure to a density of at least about 1.5 gms./cc.

2. The process of claim 1 wherein the initial compression is sufficient to form an integral structure having a density of from about 0.5 to about 0.7 gm./cc.

3. The process of claim 1 wherein the initial compression is a radial force of from about 200 to about 300 p.s.i.

4. The process of claim 1 wherein the isostatic compression is carried out at a pressure of between about 3500 and about 50,000 p.s.i.

5. The process of claim 1 wherein the initial compression is carried out by using a uniaxial force of from about 200 to about 300 p.s.i.

6. A process for the production of cylindrical anodes clad with compressed vermicular graphite which comprises
   (1) providing an electrolyte graphite core,
   (2) surrounding at least a portion of said electrolyte graphite core with vermicular graphite,
   (3) radially compressing said vermicular graphite to a density of at least about 0.25 gm./cc. in contact with said core to form a clad composite, and
   (4) subsequently isostatically compressing such clad composite by means of a pressure of about 3500 p.s.i. or greater.

7. The process of claim 6 wherein the radial compression provides a compressed vermicular graphite having a density between about 0.5 and about 0.7 gm./cc.

8. The process of claim 6 wherein the isostatic compression force is between about 3500 and about 50,000 p.s.i.

9. An improved electrode which comprises an elongated structure of compressed vermicular graphite having comparatively low electrical and thermal resistance along its longitudinal axis and comparatively high electrical and thermal resistance at right angles to its longitudinal axis.

10. A compressed vermicular graphite article prepared by compressing vermicular graphite in one vector sufficiently to produce an integral structure having a density of at least about 0.25 gm./cc. and subsequently compressing such integral structure isostatically under a pressure greater than 3500 p.s.i.

11. a clad electrode which comprises an electrographite core surrounded for at least part of its length with compressed vermicular graphite having a density of from about 1.5 gm./cc. to 2.0 gm./cc.

12. A process for cladding a cylindrical electrographite electrode with vermicular graphite having electrical orientation which comprises,
   (1) providing an electrographite core,
   (2) surrounding at least a portion of said core with vermicular graphite,
   (3) uniaxially compressing said verimcular graphite to a monolithic structure having a density of 0.10 or less,
   (4) radially compressing the structure thus obtained until such compressed vermicular graphite has a density of at least about 0.25 gm./cc. and
   (5) isostatically compressing the structure thus obtained to at least 3500 p.s.i.

13. The process of claim 6 wherein the vermicular graphite is first uniaxially compressed to form an integral structure having a density of up to about 0.18 gm./cc. prior to surrounding at least a portion of said electrolytic graphite core therewith.

References Cited
UNITED STATES PATENTS

| | | | |
|---|---|---|---|
| 1,137,373 | 4/1915 | Aylsworth | 23—209.1 |
| 1,191,383 | 7/1916 | Aylsworth | 23—209.1 |
| 2,997,744 | 8/1961 | Stoddard et al. | 204—294 XR |
| 3,357,929 | 12/1967 | Olstowski | 23—209.1 |

HOWARD S. WILLIAMS, *Primary Examiner.*

D. R. JORDAN, *Assistant Examiner.*